Nov. 21, 1933.　　C. McG. SYKES　　1,936,178
WEIGHING APPARATUS
Filed May 21, 1932　　2 Sheets-Sheet 2
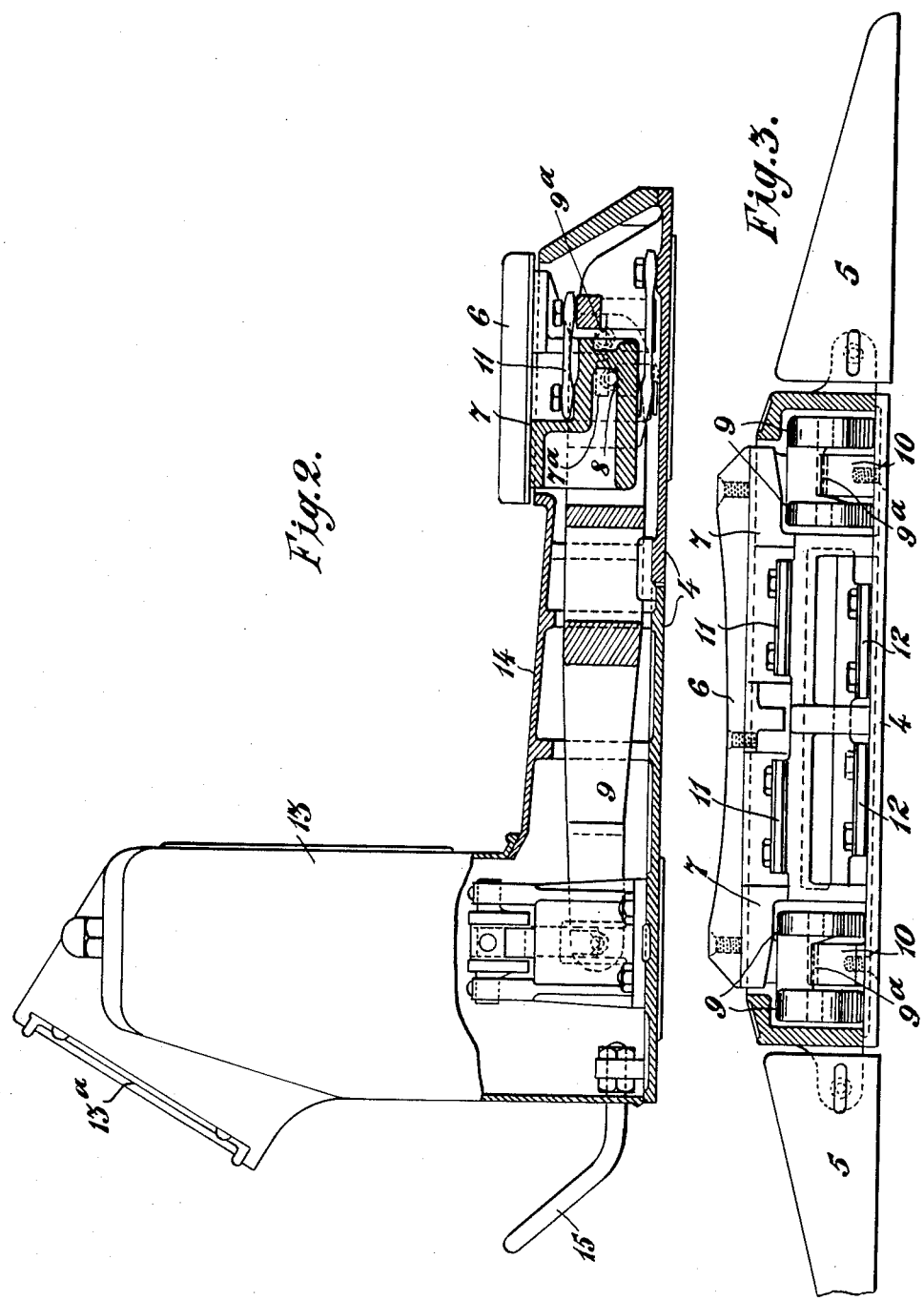

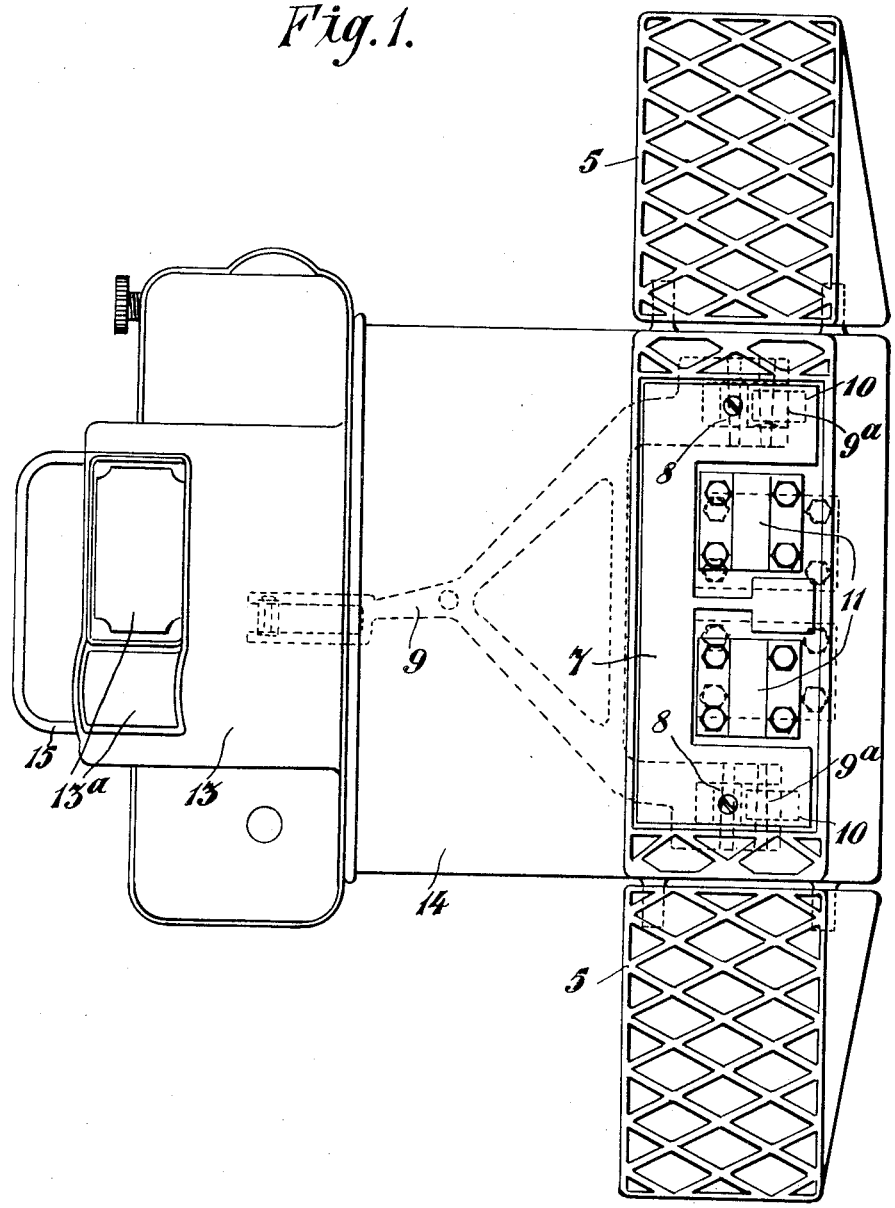

Patented Nov. 21, 1933

1,936,178

UNITED STATES PATENT OFFICE 1,936,178

WEIGHING APPARATUS

Cameron McGregor Sykes, Soho Foundry, Birmingham, England, assignor to W. & T. Avery Limited, Birmingham, England Application May 21, 1932, Serial No. 612,686, and in Great Britain May 30, 1931

1 Claim. (Cl. 265—27)

This invention has reference to improvements relating to weighing apparatus and is concerned specifically with weighing apparatus of the kind commonly employed for ascertaining the axle weight loading of vehicles, the present invention having for its object the provision of an improved weighing apparatus of the said kind which is simple in construction, efficient in operation and wherein the possibility of tipping of the weighing platform when under load is eliminated or considerably reduced.

The invention consists of an improved weighing apparatus of the kind referred to wherein the weighing platform is supported on the jawed ends of a single lever of substantially Y shape which also has connection to an automatic weight indicating mechanism the aforesaid weighing platform being coupled to a relatively fixed portion of the apparatus by flexure strips or plates acting in a parallel relationship.

The invention further resides in the details of construction of the improved weighing apparatus for determining the axle weight loading of vehicles to be described hereinafter.

The invention will now be described in its application to the accompanying sheets of drawings which illustrate the invention in its application to a weighing apparatus particularly suited for determining the axle weight loading of motor load vehicles and aircraft.

In the drawings:—

Figure 1 is a plan of the improved weighing apparatus with the weighing platform removed.

Figure 2 is a part sectional side elevation of the apparatus illustrated in Figure 1 but drawn to a larger scale, and Figure 3 is a part sectional end elevation of the weighing apparatus illustrated in Figure 1 drawn to the same scale as Figure 2 and looking in the direction of the arrow indicated in Figure 1.

In the drawings like numerals of reference indicate similar parts in the several views.

In the embodiment of the invention illustrated in the drawings the improved weighing apparatus comprises a base 4 having hingedly connected thereto at one end a pair of oppositely inclined ramps 5 which lead to a weighing platform 6.

This weighing platform 6 is bolted to the upper side of a verge or stool 7 provided with bearing blocks 7a which rest on knife-edges 8 carried intermediate the ends of the jaws of a lever 9 of a substantially Y shape.

At the ends each of the jaws of the Y shaped lever 9 is provided with a knuckle carrying a transversely disposed knife-edge 9a which rests in bearing blocks carried by standards 10 bolted to the base 4. Intermediate the ends the verge or stool 7 has bolted to the upper side thereof a pair of parallelly disposed flexible plates 11 the other ends of which are bolted to standards carried by the base 4.

The verge or stool 7 has bolted to the underside thereof a further pair of parallelly disposed flexible plates 12 the other ends of which are bolted to the base 4.

The pairs of flexible plates 11 and 12 are disposed parallel to one another and the points of attachment to the verge or stool 7 of the lower pair of plates 12 are disposed in the same vertical plane as the points of attachment of the upper pair of flexure plates 11.

The stem of the Y shaped lever 9 is connected to an automatic weight indicating mechanism of known kind, preferably embodying a spring resistant, said indicating mechanism and resistant being mounted in a housing 13 mounted on one end of the base 4. The aforesaid housing 13 co-operates with a second housing 14 which encloses the intermediate portion of the lever 9 and the mechanism located below the weighing platform 6.

The automatic weight indicating mechanism is visible through an inclined window 13a carried at the front of the upper portion of the housing 13.

Bolted to the base 4 at the end carrying the automatic indicating mechanism is a handle 15 for facilitating the manipulation of the apparatus.

It is found in practice that by employing a single Y lever 9 in conjunction with flexure strips or plates 11 and 12 acting in a parallel relationship, tipping of the weighing platform when under load is avoided or eliminated.

Claim:

An improved weighing apparatus for ascertaining axle weight loading, comprising a base, a single weighing lever of a substantially Y shape fulcrummed on said base, a verge mounted on the jawed ends of the said lever, a weighing platform carried by the said verge, a pair of oppositely inclined ramps carried by the base and leading to the said platform, flexible plates acting in a parallel relationship and coupling the verge to a relatively fixed portion of the apparatus and an automatic weight indicating mechanism connected to the said lever.

CAMERON McGREGOR SYKES.